June 7, 1932.  W. SCHAELCHLIN  1,861,454
SHIP PROPULSION SYSTEM
Filed Feb. 6, 1929
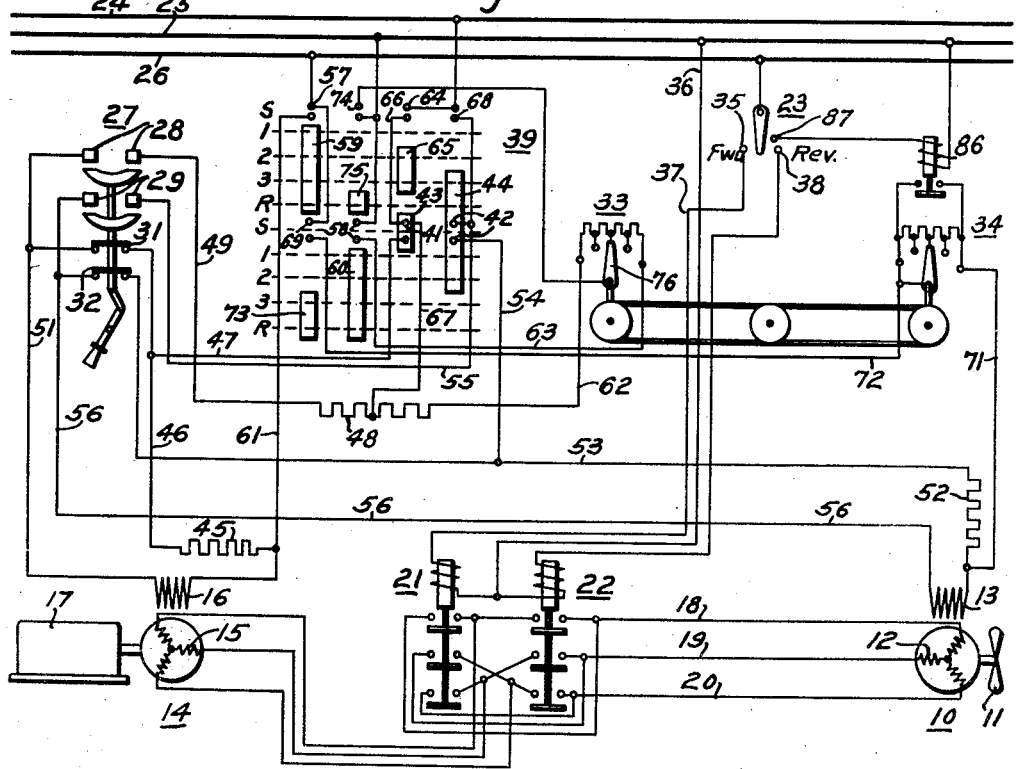
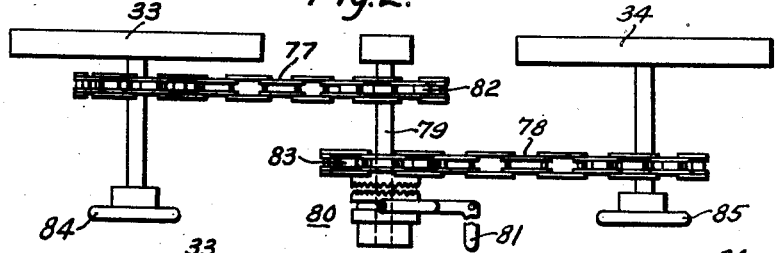
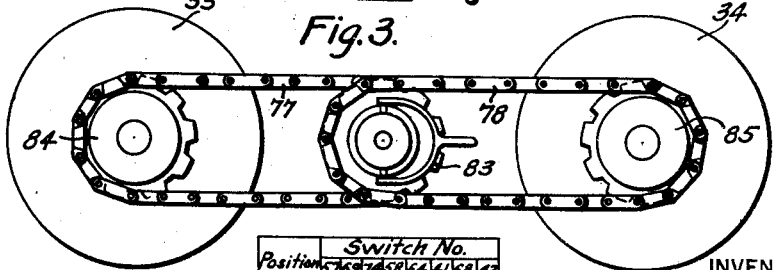
INVENTOR
Walter Schaelchlin.
BY
Wesley J. Carr
ATTORNEY Patented June 7, 1932

1,861,454

UNITED STATES PATENT OFFICE

WALTER SCHAELCHLIN, OF WILKINSBURG, PENNSYLVANIA, ASSIGNOR TO WESTINGHOUSE ELECTRIC & MANUFACTURING COMPANY, A CORPORATION OF PENNSYLVANIA

SHIP PROPULSION SYSTEM

Application filed February 6, 1929. Serial No. 337,983.

My invention relates, generally, to electric-power systems, and more particularly, to electric power systems for ship propulsion.

Heretofore, ship propulsion systems have been commonly employed which would assure the delivery of very high propeller torques for taking care of various operating conditions, common to ship propulsion. For example, in maneuvering and operating in rough seas, it becomes highly important that sufficient propeller torque be provided to take care of the sudden and frequent demands which are imposed upon the power system. Usually, induction motors, having high torque characteristics, have been employed in connection with synchronous generators, forming a system which naturally provides the desired torque and power characteristics, but at a sacrifice of operating efficiency. Also the low operating power factor of an induction motor of this type required that the size of both the motor, and the generator be increased in order that the inefficient and low power factor system be capable of developing sufficient power. Systems of this kind are objectionable from both the standpoint of cost and added weight of the propulsion system. In light ships such as cruisers, coast guard cutters and the like the consideration of weight becomes important since lightness is at least one important factor which must be considered to insure high speed operation, and ability to maneuver quickly.

The object of my invention, generally stated, is to provide an electric ship-propulsion system which shall be simple and efficient in operation, and capable of being economically manufactured, and installed.

A more specific object of my invention is to provide for correlating the adjustment of the excitation of an interconnected synchronous propulsion motor and synchronous generator to maintain system stability in accordance with the load on the system.

Another object of my invention is to provide for operating a ship propulsion system comprising an interconnected synchronous generator and synchronous motor to maintain unity power factor of the system throughout its range of operation.

A further object of my invention is to provide, in a ship-propulsion system comprising an interconnected synchronous generator and synchronous motor, for varying the kilowatt load capacity of the system to change the degree of system stability without disturbing or changing the operating power factor of the system.

Other objects of my invention will become evident from the following description taken in conjunction with the drawing in which:

Figure 1 is a diagrammatic view of an electric ship-propulsion system arranged in accordance with and embodying the features of my invention.

Figs. 2 and 3 are plan and side views respectively of a preferred arrangement of the generator and motor field-controlling rheostats which are shown schematically in Fig. 1, and Fig. 4 is a sequence chart showing the method of operation of the field-controlling switch shown in Fig. 1.

Referring now to Fig. 1 of the drawing, 10 designates generally an electric motor which may be utilized to actuate a ship propeller 11. In this instance an alternating-current synchronous motor, provided with stator windings 12, and field windings 13, is utilized.

In order to control the operation of the propulsion motor 10, a synchronous generator 14 having stator windings 15, and field windings 16, is provided for supplying power to the motor at a variable frequency and voltage.

The synchronous generator 14 may be driven by means of any suitable type of prime mover capable of having its speed readily varied to change the frequency of the generator and consequently the speed of operation of the propulsion motor 10. In this embodiment of the invention, a steam turbine 17 of any well known type is shown and connected for driving the generator 14. Since the means for controlling the operating speed of the turbine 17 are well known and form no part of this invention, it has been deemed unnecessary to illustrate them.

As shown the stator windings 12 and 15, of the motor 10, and generator 14, respectively are connected together by means of conductors 18, 19 and 20 through a plurality of reversing switches 21 and 22, which are connected in a well known manner for controlling the direction of operation of the motor. A manually operated control switch 23 is provided for controlling the operation of the reversing switches 21 and 22.

Field windings 13 and 16, of the motor and generator, respectively, may be energized from any suitable source of direct-current power which, in this instance, may be represented by line conductors 24, 25 and 26, constituting a three-wire double-voltage system.

In this embodiment of the invention a manually operated switch 27 is provided for controlling the main-excitation circuits for the generator and the motor fields. As shown, the switch 27 is provided with main contact members 28 and 29, and auxiliary contact members 31 and 32. In this instance, the auxiliary contact members 31 and 32 are utilized to establish discharge circuits for the field winding 16 and 13, when the field switch 27 is in the open position as illustrated.

In order to provide for varying the exciting current which is supplied to the generator field winding 16, and motor field winding 13, a plurality of field rheostats designated generally as 33 and 34, are provided.

In the operation of the system the generator 16 may be started by setting the prime mover 17, in operation in the usual manner, with the field switch 27 and reversing switches 21 and 22, in the open position as shown.

In order to start the propulsion motor 10 with a minimum amount of power demand upon the generator, the main circuit between the generator and motor may be established by the closure of either of the reversing switches 21 and 22, before the generator voltage is established. Therefore, if it is desired to operate the propulsion motor 10 in the forward direction, the control switch 23 may be actuated into the forward position to engage contact members 35, which connects the operating coil of the reversing switch 21 across the line conductors 25 and 26 through a circuit comprising conductors 36 and 37. Likewise, the reversing switch 22 may be closed to connect the propulsion motor for reverse operation by actuating the control switch 23 in the reverse direction to engage contact members 38.

It will be readily understood that by connecting the motor and generator together before the generator voltage is built up, the motor will be started and accelerated as an induction motor in response to the energization of the generator field which will cause the development of a predetermined voltage the value and frequency of which will be determined by the excitation and speed of operation of the generator.

In order to provide for controlling the excitation circuits for the field windings 13 and 16 in such manner as to place the system in running condition after the generator 14 has been set in operation, a field controlling switch designated generally by 39 is provided. Any suitable type of switch may be utilized for this purpose, however, in this embodiment of the invention, a manually-operated drum switch provided with suitable contact members and movable segments for controlling the excitation circuits, is illustrated.

Referring to Fig. 4 it will be observed that when the field control switch 39 is set in the "off" position which is designated, in this instance, by the legend "Secure" the contact members 41 and 42 are bridged by their corresponding contact segments 43 and 44. Since these contact members are bridged, the field discharge circuits for the motor 10 and generator 14 are maintained when the switch 27 is actuated to close the main field circuits, the field discharge circuits formerly established by the contact members 31 and 32, of the switch 27, being interrupted in response to the operation of the switch to close contact members 28 and 29. As shown the field discharge circuit for the generator field 16 extends from one side of the field winding 16, through the discharge resistor 45, conductors 46 and 47, contact members 41 bridged by the segment 43, conductor 67, a section of the resistor 48, conductor 49, contact members 28 and conductor 51 to the opposite side of the field winding 16. Likewise, the discharge circuit for the motor field winding 13 may be traced from one side of the field winding 13, through the discharge resistor 52, conductors 53, and 54, contact members 42 bridged by the segments 44, conductors 55, contact members 29 of the switch 27, and conductors 56 to the opposite side of the field winding 13.

In power systems of this character it is highly desirable that the generator excitation be controlled in such manner as to provide for causing the generator to quickly develop its rated voltage in order to get the system in operation with the least possible delay. Therefore, in this instance, provision is made for subjecting the field winding 16, of the generator 14, to an initial voltage which is equal to its rated voltage and then to a double voltage in order to produce a field forcing effect.

Therefore, upon the movement of the field control switch 39 to its first running position the pairs of contact members, 57 and 58, are bridged by the contact segments, 59 and 60, respectively. The bridging of contact members 57 and 58, establishes an energizing circuit for the generator field winding which extends from the line conductor 26 through contact members 57, conductor 61, field winding 16, conductor 51, contact members 28, conductor 49, resistor 48, conductor 62, field rheostat 33, conductor 63, and contact members 58 of the field control switch 39 to the line conductor 25. Simultaneously, with the establishment of the field excitation circuit, a pair of contact members 41, were disengaged by the contact segment 43 to interrupt the field discharge circuit formerly established by the bridging of contact members 28 of the switch 27. Therefore, it will be readily understood that the generator field winding 16 is subjected to an initial voltage carried by the line conductors 25 and 26, which in this instance, is the rated voltage of the field.

Movement of the field control switch 39 to the second position bridges the pair of contact members 64 without interrupting the circuit previously established by the bridging of contact members, 57 and 58 and, establishes the second energizing circuit for the generator field, which subjects it to the full double-voltage of the excitation source. This circuit may be traced from line conductor 24 through the contact members 64, bridged by segment 65, conductors 66 and 67, resistor 48, conductor 49, contact members 28, conductor 51, generator field winding 16, conductor 61, and contact members 57, to the line conductor 26.

Further operation of the field control switch 39 effects a disengagement of the contact segment from the contact members 42 to interrupt the field discharge circuit of the motor and establish its energizing circuit through the bridging of the pairs of contact members 68 and 69 by the contact segments 44 and 73, respectively. As shown this circuit extends from line conductor 24 through contact member 68, bridged by segment 44, conductor 55, contact members 29 of the switch 27, conductor 56, motor field winding 13, conductor 71, field rheostat 34, conductor 72, contact member 69, bridged by segment 73 to the line conductor 26. It will be readily understood that the energization of the field winding 13 causes the synchronous motor 10 to automatically pull into synchronism with the generator 14, which is operating at a speed determined by the speed of its driving turbine 17.

When the field control switch 39 is actuated to its last, or running position designated as "R", it disengages the contact segment 44 from contact members 42 to interrupt the double voltage excitation circuit to the generator field winding 16, while the remaining contact members 57 and 58 are still bridged to maintain the rated voltage excitation circuit. It will be evident that during the transition periods from rated excitation voltage to double voltage and back again to rated voltage, the original rated voltage excitation circuit was maintained through the total resistance of the generator field rheostat 33, which provided a relatively high resistance discharge circuit for the generator field during the transition periods, which insures smooth transition without disconnecting the field winding from the source of supply. When the field control switch 39 stands in position "R", the pair of contact members 74 are bridged by the contact segment 75 to connect the contact arm 76 of the field rheostat 33 to the line conductor 25 thereby to render the rheostat 33 effective to vary the generator excitation. As described hereinbefore this circuit extends through the rheostat 33, conductor 63, and contact members 58 to the line conductor 25.

In order to control the power factor of the system, propulsion motor 10 and the generator 14 are designed to have substantially the same electrical characteristics. It has been found, in practice, that two synchronous machines operating in this relation may be caused to operate at any desired power factor depending upon their relative excitations, provided that the short-circuit characteristics of the two machines are substantially the same. In other words, if the internal characteristics of the machines are such that for equal load currents the internal drop of potential is practically the same, a setting of the field excitation to provide a predetermined power factor for one speed and load will cause the power factor to remain the same over the whole range of operation. In this instance, unity power factor operation is the most desirable since, at this power factor, the system will operate at its maximum efficiency and deliver a maximum amount of power. It will be readily understood that once the field excitations of the motor and generator have been adjusted to provide unity power factor operation, it is necessary to maintain this ratio between the generator, and motor excitations in order that this power factor condition may not be disturbed when the voltage of the generator is varied by changing its excitation. Therefore, in this embodiment of the invention, provision is made for connecting the generator field rheostat 33 and motor field rheostat 34 together after they have once been properly adjusted in order that the movement of one will effect a corresponding movement of the other.

Referring to Figs. 2 and 3, it will be observed that this function is accomplished by means of a plurality of sprocket chains 77 and 78 which connect the operating shaft of each rheostat to a clutch shaft 79, which is provided with a toothed clutch 80, which may be operated by a lever 81 to clutch the sprocket wheels 82 and 83 which are carried by the shaft 79 into any desired relative position. The rheostats 33 and 34 are provided with operating wheels 84 and 85, respectively, either of which may be used to effect the simultaneous operation of both rheostats.

Another important function effected by a field control arrngement of this kind is that of controlling the stability of the system with a minimum amount of adjustment of the field excitations. It will be readily understood that a power system of this character when in operation is capable of developing a predetermined maximum kilowatt output. This maximum kilowatt output is determined for a given pair of machines by the degree of field excitation and is a measure, or indication, of the stability of the system. When this point of maximum kilowatt output is passed, the system has passed its maximum stability point and the motor will drop out of synchronism with the supply generator, due to the fact that the synchronizing power between the two machines is no longer sufficient to maintain them in their proper relative phase position. Therefore, it will be readily understood that a change in the excitation of the generator effects a corresponding change in the maximum kilowatt load which it may deliver and a change in the excitation of the synchronous motor effects a corresponding change in its maximum pull out torque. When two machines of this character are operating together, a simultaneous change in field excitation of the two machines in a predetermined ratio effects the kilowatt capacity of the system, or in other words, it causes a change in the stability of the system. In the event the excitation of the two machines is increased to maximum value in the same ratio as that determined for unity power factor operation, the maximum point of the system stability is provided.

As described hereinbefore, the control of the stability of the system may be easily controlled by operating either of the field rheostats 33 and 34, to simultaneously lower or raise the excitation currents. Any suitable instrument may be utilized for indicating to the operator the degree of stability of the system. Therefore, it is evident that only a simple and comparatively easy adjustment is all that is required of the operator in the event the ship is changed from low to high speed or vice versa. In many instances, the cruising speed is low, which requires that the power system deliver a small amount of power, therefore, the field excitation may be adjusted to provide a low degree of stability, which causes the system to operate more efficiently under light load conditions and as the load increases the degree of system stability may be raised a corresponding amount, which keeps the operating efficiency of the system at the highest possible value throughout its range of operation.

In reversing the operation of the ship, the propulsion motor is required to deliver a high torque which, in many instances, is considerably greater than the torque required for ordinary operation. In order to provide for increasing the pull out torque of the propeller motor to its maximum value in performing reversing operations, provision is made for short-circuiting the field rheostat 34 in response to the actuation of the control switch 23 to the reverse position. As shown, the resistance unit of the rheostat 34 is disposed to be shunted upon the closure of a relay 86, the energizing circuit of which is controlled by a contact member 87, provided on the control switch 23. It will be evident that when the motor field excitation is suddenly increased in this manner that the unity power factor conditions of the system no longer exist. However, in this instance, the importance of obtaining maximum torque of the propeller motor is greater than that of maintaining the operation of the system at unity power factor.

In view of the foregoing discussion, it is evident that by utilizing a pair of synchronous machines having substantially the same electrical characteristics and controlling the relative values of excitations of the two machines, that the most desirable power factor condition of the system may be automatically maintained and the stability of the system readily varied to obtain the most efficient operation over a wide operating range, of the system, without resorting to complicated meter equipment for observing the relative values of excitation of the machines.

It may be stated in conclusion that while the illustrated example constitutes a practical embodiment of my invention, I do not wish to limit myself strictly to the exact details herein illustrated since modifications of the same may be made without departing from the spirit of the invention as defined in the appended claims.

I claim as my invention:

1. In a marine drive, in combination, a synchronous-propulsion motor, a synchronous generator for supplying power to the motor, means for driving the generator at a variable speed to control the speed of the propulsion motor, said motor and generator being provided with separately-excited field windings, and having substantially the same short-circuit charcteristics, means for controlling the excitation of the machines, said means comprising a plurality of field rheostats independently operable to establish unity power factor conditions in the system, and means for effecting simultaneous operation of the rheostats while maintaining their original relative positions for unity power factor operation, whereby different degrees of excitation, in the same ratio, may be obtained to establish different degrees of system stability in accordance with the load imposed upon the motor and generator.

2. In a marine drive, in combination, a synchronous motor provided with a separately-excited field winding, said motor having a predetermined short-circuit characteristic, a synchronous generator provided with a separately excited field winding for supplying power to the motor, said generator having a short-circuit characteristic substantially the same as the motor, a prime mover for driving the generator, a source of current for energizing the field windings, means for independently controlling the excitation of the generator and motor field winding, said means being disposed to effect definite variations in the excitation current, and means for controlling the operation of said excitation controlling means to effect a simultaneous variation of the exciting currents in predetermined proportions, thereby, to maintain the internal voltages of the generator and motor in a constant predetermined relationship to prevent the circulation of reactive power between the generator and motor as the strength of the motor excitation is increased with increase in load.

3. In a marine drive, in combination, a synchronous motor provided with a separately-excited field winding, said motor having a predetermined short-circuit characteristic, a synchronous generator provided with a separately excited field winding for supplying power to the motor, said generator having a short-circuit characteristic substantially the same as the motor, a switch for controlling the direction of operation of the motor, means for controlling the excitation of the generator and motor field windings, said means being disposed to effect predetermined variations in the excitation of each machine simultaneously, to maintain continuous stability in the operation of the machines as the excitation is varied to suit the load conditions, and means responsive to the direction-controlling switch for controlling the motor excitation independently of the generator excitation for reversing operation, whereby the field of the motor is excited to a maximum in response to the operation of the said switch to the reverse position to provide maximum motor torque.

4. In a power-transmission system, in combination, a synchronous motor which may be subjected to a variable load, a synchronous-generator set for supplying power at variable voltage and frequency to the motor, said generator and motor having substantially the same electrical characteristics adapting them for parallel operation, a source of double voltage power for exciting the generator and motor, means for initially controlling the excitation of the machines, said means comprising means for subjecting the generator field to a combination of voltages obtained from the excitation source and for connecting the motor field to the source, and means operable to adjust the relative degrees of excitation of the machines to cause them to operate at unity power factor, said means being disposed for simultaneous operation, whereby the excitation of the machines may be increased or decreased to control the operating stability of the system in accordance with the load variation of the motor.

5. In a power-transmission system, in combination, a synchronous motor which may be subjected to a variable load, a synchronous generator set for supplying power at variable voltage and frequency to the motor, said generator and motor having substantially the same electrical characteristics adapting them for parallel operation, rheostatic means associated with each machine for initially adjusting the excitation of each machine independently of the other to obtain unity power-factor during the operation of the system, and means for jointly actuating said rheostatic means associated with each machine disposed to maintain said relative excitation of the motor and generator, whereby the unity power factor condition may be maintained regardless of changes in voltage and frequency of the system.

6. In an electric drive for ship propulsion, in combination, a propulsion motor provided with a field winding, a generator provided with a field winding for supplying power to the motor, said generator and motor having substantially the same short-circuit characteristics which enables them to develop the same internal voltages for equal values of excitation, a double voltage supply for exciting the field windings, manually-operable means for controlling the connection of said field windings to the voltage supply, said means being disposed to initially subject the generator field winding to double normal voltage to obtain a rapid voltage rise, and manually-operable means for controlling the exciting current in the field windings, said means being disposed to permit individual adjustment of the excitation currents and simultaneous adjustment thereafter to cause both machines to operate at substantially the same power factor and at a predetermined power factor regardless of the load variation on the system.

7. In an electric drive for ship propulsion, in combination, a propulsion motor provided with a field winding, a generator provided with a field winding for supplying power to the motor, said generator and motor having substantially the same short-circuit characteristics which enables them to develop the same internal voltages for equal values of excitation, a rheostat disposed to control the excitation of each field winding and mechanical means for concurrently operating both rheostats to simultaneously vary the field excitation of the machines in predetermined degrees to maintain a predetermined relative excitation of the two machines, whereby their internal voltages may be maintained in a predetermined ratio as the load on the system changes in response to the desired movements of the ship.

8. In an electric-ship propulsion system in combination, a synchronous generator disposed to operate at variable frequency, a synchronous propulsion motor having substantially the same electrical characteristics as the generator, said motor being connected in parallel circuit relation to the generator and subjected to the variable frequency generator voltage to vary its speed to control the speed of the ship, a source of excitation voltage for the generator and motor and means for controlling the excitation of the machines, said means being disposed to permit individual adjustment of the excitation of the machines to establish a predetermined power-factor condition in the system and operable to thereafter simultaneously regulate the excitation of both machines to provide maximum stability and maintain the preselected power factor in their synchronous operation regardless of the load variation.

9. In an electric ship propulsion system, in combination, a synchronous generator disposed to operate at variable frequency, a synchronous-propulsion motor having substantially the same electrical characteristics as the generator, said motor being connected in parallel circuit relation to the generator and subjected to the variable frequency generator voltage to vary its speed to control the speed of the ship, means for controlling the excitation of the machines, said means being disposed to separately regulate the excitation of each machine to establish a predetermined power-factor condition in the system and operable to simultaneously regulate the excitation of both machines to provide maximum stability in their synchronous operation regardless of the load variation, and means responsive to the reversal of the propulsion motor for automatically increasing the motor excitation to a maximum to provide maximum motor torque and stabilizing power for reverse operation of the ship.

10. In a power-transmission system, in combination, a synchronous motor, a synchronous generator for supplying power to the motor, said motor and generator having substantially the same short-circuit characteristics, means for driving the generator, a source of excitation for the motor and generator, rheostats for varying the separate excitation of the motor and generator, a manually-operable controller for controlling the initial energization of the motor and generator, said controller being disposed to render the rheostats effective only when actuated to a predetermined position, said rheostats being disposed for individual operation to permit the adjustment of the relative field excitations of the motor and generator to establish a predetermined power-factor condition, and means for mechanically connecting the rheostats together to provide for maintaining a predetermined relation between the field excitations to maintain a constant system power factor and system stability in accordance with the load being carried by the system.

11. In a marine drive, in combination, a synchronous generator having a separately-excited field winding, a synchronous motor provided with a separately-excited field winding disposed to be connected to the generator, a source of power for exciting the field windings of the generator and motor, and means for simultaneously varying the excitation of the generator and motor field windings in predetermined proportions to maintain continuous stability in the operation of the machines as the excitation of the field windings is varied to meet load conditions, said means including individual means associated with each field winding independently operable to initially adjust the excitation of each machine independently of the other.

In testimony whereof, I have hereunto subscribed my name this 4th day of February, 1929.

WALTER SCHAELCHLIN.